Sept. 11, 1928.

C. H. GUNN

RESILIENT AUTOMOBILE SEAT

Filed April 14, 1926

1,683,885

INVENTOR
*C. H. Gunn*

BY *Perry J. Webster*
ATTORNEY

Patented Sept. 11, 1928.

1,683,885

UNITED STATES PATENT OFFICE.

CHARLES H. GUNN, OF SAN FRANCISCO, CALIFORNIA.

RESILIENT AUTOMOBILE SEAT.

Application filed April 14, 1926. Serial No. 101,897.

This invention relates to seats for motor vehicles and the like, and particularly to a single-occupant seat, such as is provided for the use of the driver on trucks and like vehicles.

The principal object of my invention is to provide a resilient seat having a three-point suspension for the spring or resilient means so arranged that it will conform in its movements to the movements of the human body, and in such a manner that it will absorb all jars and shocks, both vertical and horizontal.

A further object of the invention is to construct a seat in such a manner that the spring elements cannot possibly protrude through the upper padding and covering of the seat, and the upholstering therefore will not sag or form uneven pockets like those found in the present type of seat after they have seen considerable service.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
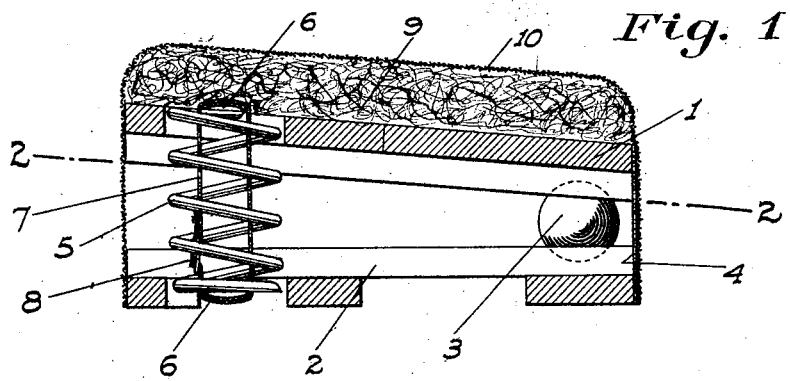
Fig. 1 is a cross section of the seat.
Figure 2:
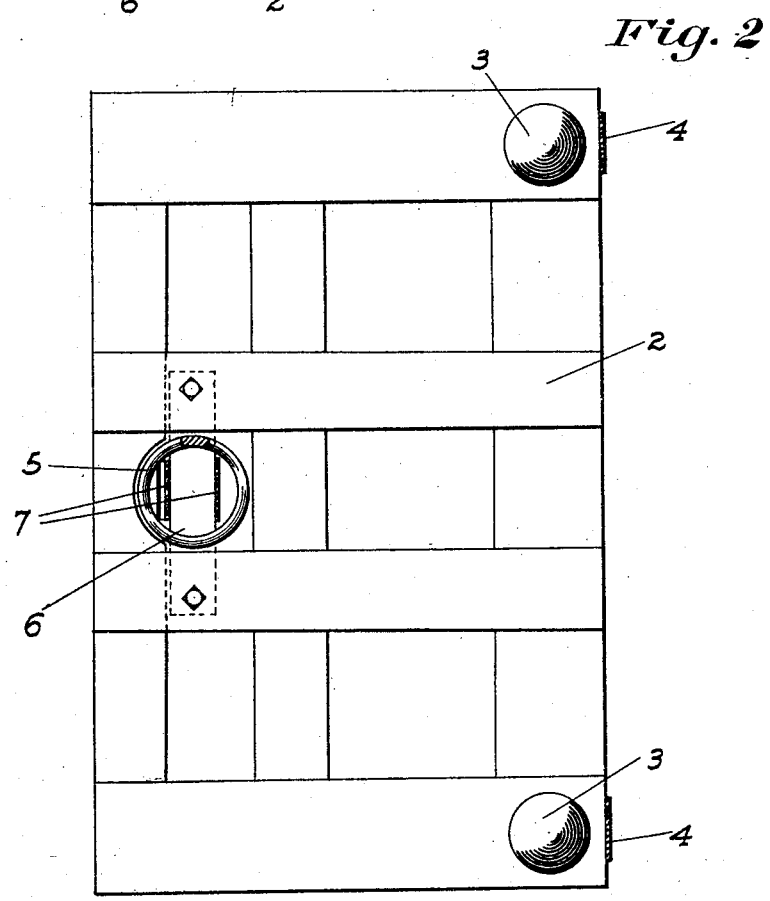
Fig. 2 is a horizontal sectional plan of the seat taken substantially on the line 2—2 of Fig. 1 with the outer covering removed.

Referring now more particularly to the characters of reference on the drawings, the seat comprises upper and lower rigid horizontal frames 1 and 2 built up in any suitable manner and spaced apart a certain distance. The upper frame 1 is preferably of solid construction, whereas the lower frame 2 may be built up of a number of spaced pieces, rigidly connected together, for the sake of lightness.

Both frames are socketed adjacent their back corners, to locate solid but resilient rubber balls 3, which maintain the backs of the frames separated in yieldably spaced relation. Said frame-backs adjacent the balls are connected by vertical straps 4 of flexible but non-elastic material, such as leather.

Extending between the frames adjacent their front edges and centrally between the side edges is a single compression spring 5. This spring is supported at its ends by transverse metal bars 6 connected to the frames, said spring being capable of a much greater compressive movement than the balls 3. A leather strap 7 extends around and between the bars, said strap having suitable take-up means such as a buckle structure indicated at 8. This enables the normal tension of the spring to be regulated at will to suit different loads and other conditions. A layer of padding 9 of hair or the like is placed on top of the frame 1, the padding and frames being enclosed in a covering 10 of flexible material, fabric or leather, which is secured to the lower frame 2 around the edges thereof.

By reason of this construction it will be seen that a three-point expansion of the upper and actual seat frame is had. The front spring permits of the greatest resiliency and up and down movement, where it is most needed on account of supporting the greatest weight of the occupant, and also on account of the fact that the leg movement of the occupant is always greater adjacent the knees (which are ahead of the seat) than the hips (which are near the back of the seat). The balls also provide for a certain up and down movement of the seat, but to a much lesser extent, corresponding to the lesser movement of the hips as above described. The balls however serve another and more important function in allowing the seat to yield horizontally as well as vertically in any direction, so that the seat is practically mounted for floating universal movement, and all jars and shocks are absorbed no matter from what direction they may come.

The balls and the straps 4 provide a resilient hinge for the seat allowing the seat to tilt up and down with the weight of the occupant so that it will accommodate itself to the body movements as above described.

The upper frame being solid throughout, and the resilient or cushion supports being all below said frame, there is no chance for these supporting elements to break through the padding and upholstery as is possible with the present form of seat.

The frames being rigid and unyielding in themselves only the one centrally located front spring is necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A resilient seat including upper and lower frames spaced apart, hinge means connecting the frames at the back, a compression spring between the frames at the front, horizontal bars narrower than the springs secured to the frames and against which the ends of the spring abut, a flexible strap passing inside the spring and around the bars, and take-up means between the ends of the strap.

2. A resilient seat including upper and lower frames spaced apart, hinge means connecting the frames at the back, said hinge means comprising resilient balls disposed between the frames, and flexible but non-elastic straps extending between the back edges of the frames; and a centrally disposed compression spring between the frames at the front.

3. A resilient seat including upper and lower frames spaced apart, hinge means connecting the frames at the back, said hinge means comprising universally resilient members disposed between the frames, and flexible straps connecting the frames to restrict the upward movement of the upper frame; and a resilient member between the frames at the front.

In testimony whereof I affix my signature.

CHARLES H. GUNN.